United States Patent [19]

Rees

[11] 4,184,836
[45] Jan. 22, 1980

[54] MULTIPLE MOLD FOR PRODUCING ELONGATE TUBULAR ARTICLES

[75] Inventor: Herbert Rees, Willowdale, Canada

[73] Assignee: Husky Injection Molding Systems Ltd., Bolton, Canada

[21] Appl. No.: 872,760

[22] Filed: Jan. 27, 1978

[51] Int. Cl.² ............................................... B29F 1/00
[52] U.S. Cl. ................................ 425/588; 249/110; 425/581
[58] Field of Search ................. 425/588, 542, 581; 249/105, 110; 264/329, 331

[56] References Cited

U.S. PATENT DOCUMENTS

| | | | |
|---|---|---|---|
| 2,339,443 | 1/1944 | Wilson | 425/588 |
| 2,799,435 | 7/1957 | Ablanalp | 249/110 |
| 3,159,878 | 12/1964 | Scott, Jr. et al. | 249/105 |
| 3,339,239 | 9/1967 | Peck | 249/110 |
| 3,351,691 | 11/1967 | Wilford | 264/90 |
| 3,663,145 | 5/1972 | Teraoka | 425/588 |
| 3,897,929 | 8/1975 | Hartmann | 249/105 |

Primary Examiner—Donald J. Arnold
Attorney, Agent, or Firm—Karl F. Ross

[57] ABSTRACT

A central chamber of a mold body, communicating through a heated nozzle with a supply channel, has a plurality of peripherally spaced injection orifices opening into respective cavities for the molding of tubular articles such as shells of disposable syringes, each cavity being defined by a generally cylindrical recess in the mold body paralleling the nozzle axis and a core received with all-around clearance in that recess. Each cavity has two elongate sections of larger and smaller diameter interconnected by a wider annular gap at the level of the injection orifices; the axial width of the annular gap progressively diminishes with increasing distance from the corresponding orifice.

8 Claims, 1 Drawing Figure

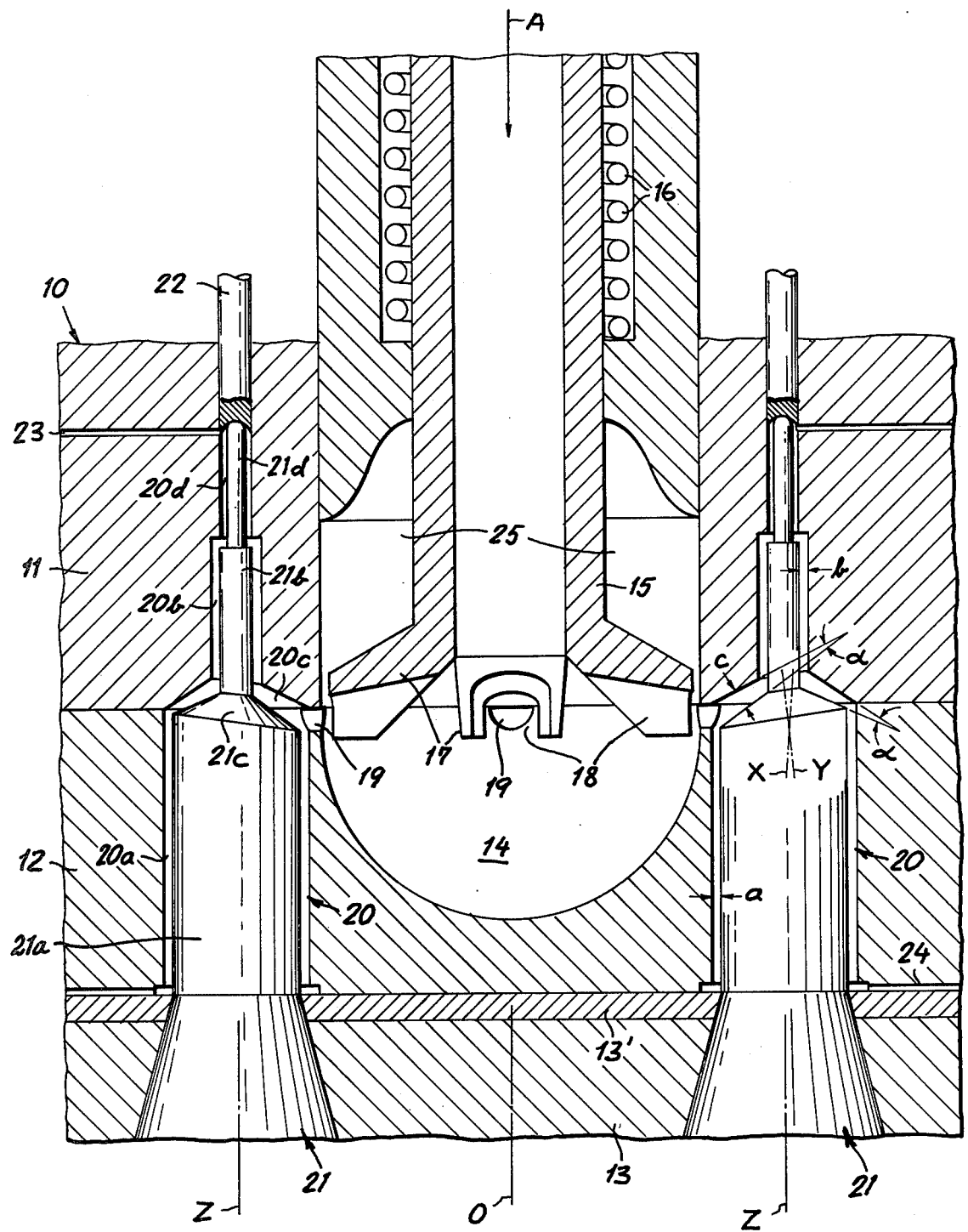

MULTIPLE MOLD FOR PRODUCING ELONGATE TUBULAR ARTICLES

FIELD OF THE INVENTION

My present invention relates to a multiple mold of an injection-molding machine designed to produce elongate tubular articles, e.g. shells of disposable syringes.

BACKGROUND OF THE INVENTION

The injection molding of thin-walled tubular articles, such as the aforementioned syringe shells, generally requires an axial introduction of the flowable plastic mass into a correspondingly shaped mold cavity defined by a recess in the mold body and a coacting core. In a multiple mold designed to produce several such tubular articles simultaneously by the hot-runner technique, axial injection is inconvenient since it requires either a large mold body, with the several recesses radiating in different directions from a central injection chamber, or a number of feed channels branching out from a common chamber which have to be individually heated to maintain the fluidity of the mass. Attempts to fill the mold cavities via off-axial injection orifices have been largely unsuccessful, owing to the eccentric flow pattern which results in irregular hardening and corresponding nonuniformity in thickness and strength. Multiple molds of this type have therefore been usually limited to the manufacture of relatively shallow workpieces, e.g. as shown in U.S. Pat. No. 3,822,856.

OBJECT OF THE INVENTION

The object of my present invention, therefore, is to provide an improved multiple mold for the purpose described which obviates the aforestated drawbacks.

SUMMARY OF THE INVENTION

I have found, pursuant to my present invention, that this object can be realized in the molding of stepped tubular workpieces—such as the syringe shells referred to—by lateral injection at an annular zone separating a large-diameter portion of the mold cavity from an adjoining small-diameter cavity portion. Thus, a multicavity mold according to my invention has a body provided with a central chamber flanked by a plurality of recesses divided into coaxial large-diameter and small-diameter sections of generally cylindrical shape; a stepped core extending into each recess defines therewith an elongate cavity whose large-diameter and small-diameter portions are interconnected by a generally transverse annular gap of greater width defined by confronting shoulders of the recess and the core. The central chamber communicates with the several cavities through peripherally spaced injection orifices opening into the annular gaps thereof. A molten plastic mass under pressure, introduced into that chamber, enters the annular gap of each cavity through the corresponding injection orifice and spreads from there in opposite axial directions to fill both cylindrical portions substantially simultaneously. Thanks to the larger width of this annular gap (measured in a generally axial direction) compared with the radial width of the adjoining cavity portions, the plastic mass distributes itself substantially uniformly in the gap between the shoulders of the stepped recess and core before changing direction and entering the cylindrical cavity portions.

Advantageously, in accordance with a more particular feature of my present invention, the width of the annular gap diminishes with increasing distance from the corresponding injection orifice so as to compensate for the decrease in injection pressure which the plastic mass undergoes along its flow path. In this way, the axially effective pressure components can be kept substantially uniform over the entire peripheries of the two cylindrical cavity portions. I have found that, with the usual injection pressure on the order of 1,000 atmospheres at the source, workpieces with wall thicknesses of about 1 to 2 mm can be produced with a high degree of uniformity if the angle of convergence of the gap boundaries is about 1° to 5°.

BRIEF DESCRIPTION OF THE DRAWING

The above and other features of the invention will now be described in detail with reference to the accompanying drawing the sole FIGURE of which shows, somewhat schematically, a multiple mold according to my invention in axial section.

SPECIFIC DESCRIPTION

The mold shown in the drawing has a body 10 formed from two fixedly interconnected plates 11 and 12, carried in the usual manner on a nonillustrated fixed platen, and a further plate 13 on a movable platen also not shown. Mold plate 13 carries a stripper plate 13' which is limitedly separable therefrom, in a manner known per se, after withdrawal from stationary plates 11, 12. Plate 12 is formed with a central chamber 14 communicating through a nozzle 15 with a source of hot plastic material under pressure, represented diagrammatically by an arrow A. Nozzle 15 is kept at an elevated temperature by a heater 16 surrounding its stem which terminates in a plurality of bifurcate feet 17 with substantially radial slots 18. The slots are aligned with respective injection orifices 19 leading to a group of generally cylindrical recesses 20 flanking the chamber 14, each recess comprising a large-diameter section 20a, a small-diameter section 20b, an intervening frustoconical section 20c and a narrow terminal section 20d. A core 21 rigid with movable mold plate 13 extends into each recess 20, the core comprising a large-diameter section 21a, a small-diameter section 21b, an intervening frustoconical section 21c and a needle-shaped terminal section 21d. In the illustrated closed position of the mold 10, the tip of core extremity 21d is received in a concave face of a rod 22 rigid with plate 11, serving as a counterbearing for the core in a manner known per se. Recess sections 20a, 20b, 20d and core sections 21a, 21b, 21d are all centered on a common axis Z parallel to the mold axis O.

While the drawing shows only two recesses 20 and cores 21 defining as many cavities, it will be evident that chamber 14 can be surrounded by a cluster of such cavities, e.g. four of them spaced 90° apart. The injection orifice 19 of a third cavity is, in fact, visible.

The major cavity portions defined by recess sections 20a, 20b and core sections 21a, 21b are substantially cylindrical and have widths a and b of 1 to 1.5 mm, for example. The two recess sections may, however, be slightly tapered to facilitate the extraction of the molded tubes from their cavities 20 together with the cores 21 on which they are formed. With the mold open, the finished workpieces are detached from their cores with the aid of stripper plate 13'.

The confronting frustoconical shoulders forming the stepped recess and core sections 20c and 21c, with minor bases adjoining the small-diameter recess and core sections 20b, 21b, are not exactly centered on cavity axis Z but have slightly inclined axes X and Y whereby their generatrices, within a common radial plane including the axes O, X, Y and Z, converge at a small angle $\alpha$, with increasing distance from the corresponding orifice 19. Angle $\alpha$, exaggerated in the drawing for the sake of clarity, may be about 2° where the average gap width c is about twice the wall thickness a or b, i.e, roughly 2 to 3 mm in the example given.

The diameter of core extremity 21d is slightly less than that of the surrounding recess section 20d whereby a narrow venting channel is formed, this venting channel communicating with the atmosphere through a bore 23 in plate 11. Another venting channel is formed by a groove 24 in the face of plate 12 to facilitate the escape of air from the large-diameter cavity section.

Cores 21 may be cooled in the usual manner, by water circulating therethrough, to expedite the solidification of the injected plastic mass. With nozzle 15 maintained at an elevated temperature by heater 16, plastic material in a more or less fluid state fills the cavity 14 as well as adjoining spaces 25. In each molding cycle, the gap 20c of each cavity is quickly filled through its orifice 19 whence the plastic material flows in opposite directions into cavity portions 20a and 20b, distributing itself evenly about the cavity axis Z. The result is a molded workpiece of virtually uniform wall thickness and strength in each of its cylindrical sections.

I claim:

1. A mold for simultaneously producing a plurality of elongate tubular plastic workpieces, comprising:

a mold body provided with a central axis and with a chamber centered on said axis and flanked by a plurality of elongate parallel recesses each longitudinally divided by an intermediate step into a large-diameter section and a small-diameter section of generally cylindrical shape coaxial with each other;

a stepped core extending into each recess and defining therewith an elongate cavity with a first portion formed by said large-diameter section and a second portion formed by said small-diameter section, said portions having a common axis substantially parallel to said central axis and being interconnected by a generally transverse annular gap of greater width than said first and second portions, centered on said common axis and defined by confronting shoulders of said recess and said core, said chamber being provided with a plurality of peripherally spaced, generally radial injection orifices opening from the outside into the annular gaps of respective cavities at points proximal to said central axis; and a source of molten plastic mass under pressure communicating with said chamber for forcing said mass through said injection orifices into said annular gap and thence into both said portions of each cavity.

2. A mold as defined in claim 1 wherein said annular gap has a generally axial width diminishing with increasing distance from the corresponding injection orifice.

3. A mold as defined in claim 2 wherein said shoulders are substantially frustoconical with minor bases adjoining said small-diameter section.

4. A mold as defined in claim 3 wherein the generatrices of said shoulders of each recess and the respective core include angles of about 1° to 5° with each other in a common axial plane.

5. A mold as defined in claim 4 wherein said first and second portions have a width on the order of 1 mm.

6. A mold as defined in claim 1 wherein the width of said gap is approximately twice that of said first and second portions.

7. A mold as defined in claim 1 wherein said chamber is centered on an axis parallel to that of said coaxial sections.

8. A mold as defined in claim 1 wherein said mold body is provided with venting channels facilitating the escape of air from said portions of said cavities.

* * * * *